(12) United States Patent
Haga

(10) Patent No.: US 10,247,118 B2
(45) Date of Patent: Apr. 2, 2019

(54) CONTROL APPARATUS FOR INTERNAL COMBUSTION ENGINE

(71) Applicant: Toyota Jidosha Kabushiki Kaisha, Toyota-shi, Aichi-ken (JP)

(72) Inventor: Hiroyuki Haga, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/426,613

(22) Filed: Feb. 7, 2017

(65) Prior Publication Data
US 2017/0276080 A1 Sep. 28, 2017

(30) Foreign Application Priority Data
Mar. 22, 2016 (JP) .................................. 2016-057173

(51) Int. Cl.
*F02D 41/00* (2006.01)
*F02M 26/36* (2016.01)

(52) U.S. Cl.
CPC ......... *F02D 41/0077* (2013.01); *F02M 26/36* (2016.02)

(58) Field of Classification Search
CPC ............................. F02D 41/0077; F02M 26/36
See application file for complete search history.

(56) References Cited

U.S. PATENT DOCUMENTS

| | | | | |
|---|---|---|---|---|
| 3,844,260 | A * | 10/1974 | Scott, Jr. ................ | F02M 26/55 123/568.29 |
| 7,131,263 | B1 * | 11/2006 | Styles .................... | F02M 26/25 60/278 |
| 2015/0027421 | A1 * | 1/2015 | Yamashita ............ | F02D 41/123 123/568.21 |
| 2017/0022940 | A1 | 1/2017 | Minami et al. | |
| 2017/0030305 | A1 * | 2/2017 | Sugiyama ........... | F02D 41/0065 |
| 2017/0089279 | A1 * | 3/2017 | Yoeda ................. | F02D 41/0077 |
| 2017/0101968 | A1 * | 4/2017 | Hayashi ............. | F02D 41/0065 |
| 2017/0259807 | A1 * | 9/2017 | Naidu ................... | B60W 20/19 |
| 2017/0276080 | A1 * | 9/2017 | Haga ..................... | F02M 26/36 |

FOREIGN PATENT DOCUMENTS

| | | |
|---|---|---|
| JP | 2007-198310 A | 8/2007 |
| JP | 2010-133287 A | 6/2010 |
| JP | 2012-255405 A | 12/2012 |
| JP | 2015-124729 A | 7/2015 |
| JP | 2015-197078 A | 11/2015 |

* cited by examiner

*Primary Examiner* — Hieu T Vo
*Assistant Examiner* — Sherman Manley
(74) *Attorney, Agent, or Firm* — Dinsmore & Shohl LLP

(57) ABSTRACT

A control apparatus for an internal combustion engine that includes an EGR channel and an EGR valve is configured, when the internal combustion engine is in a warm-up process and when an intake air flow rate that is a flow rate of air supplied to the internal combustion engine main body is less than or equal to a predetermined value, to open the EGR valve with a minute opening degree that is an opening degree smaller than a minimum opening degree of the EGR valve with which a condensed water in an exhaust-channel-side portion that is a portion of the EGR channel on a side closer to the exhaust channel relative to the EGR valve flows into an intake-channel-side portion that is a portion of the EGR channel on a side closer to the intake channel relative to the EGR valve.

2 Claims, 4 Drawing Sheets

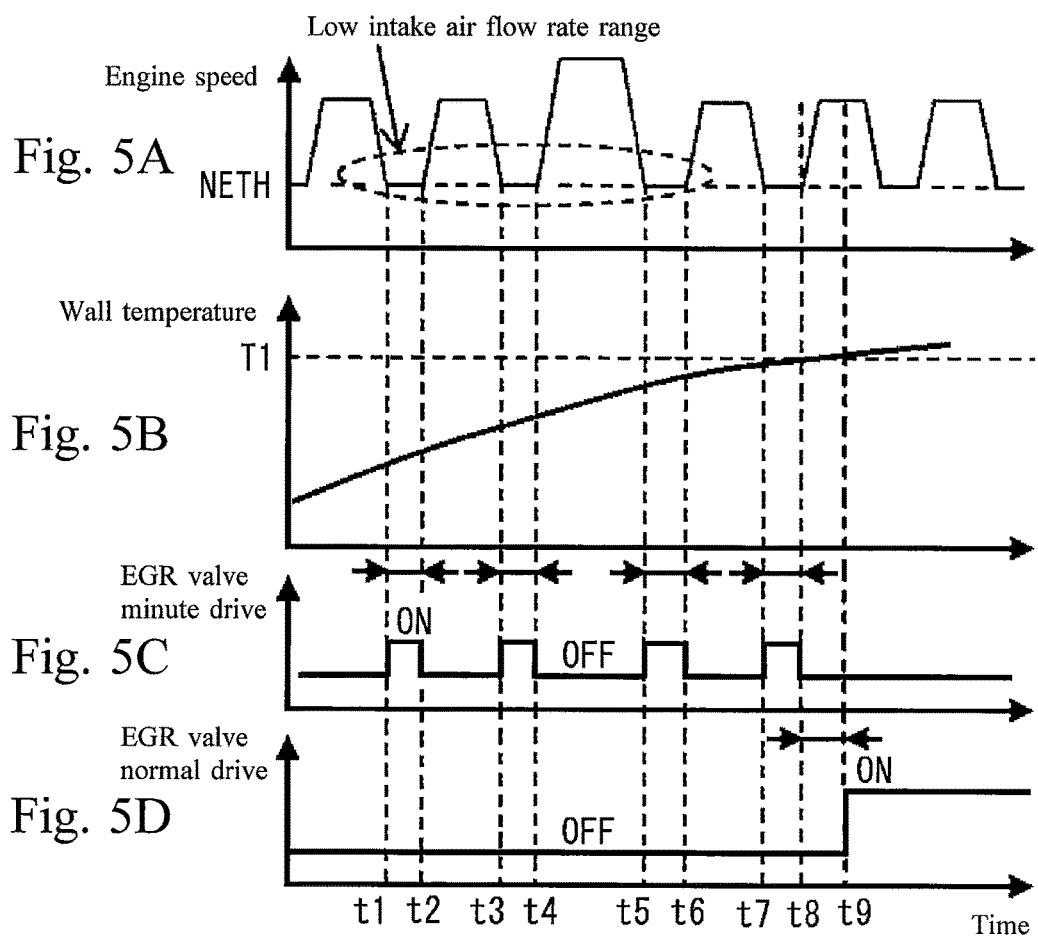

CONTROL APPARATUS FOR INTERNAL COMBUSTION ENGINE

CROSS-REFERENCE TO RELATED APPLICATION

This application is based on and claims the benefit of Japanese Patent Application No. 2016-057173, filed on Mar. 22, 2016, which is incorporated by reference herein in its entirety.

BACKGROUND

Technical Field

The present disclosure relates to a control apparatus for an internal combustion engine that includes an EGR channel and an EGR valve.

Background Art

An internal combustion engine that includes an EGR channel and an EGR valve is known. JP 2007-198310A discloses an example of this kind of internal combustion engine. The internal combustion engine disclosed in JP 2007-198310A is provided with: a supercharging device that supplies a pressurized intake air to an internal combustion engine main body; an EGR channel that recirculates, into an intake channel connected to the internal combustion engine main body, a part of exhaust gas that flows in an exhaust channel connected to the internal combustion engine main body; and an EGR valve that is arranged in the EGR channel to adjust the amount of EGR gas recirculated into the intake channel through the EGR channel.

In the internal combustion engine disclosed in JP 2007-198310A, the intake air pressurized by the supercharging device is introduced into the EGR channel, and a condensed water in the EGR channel is thereby blown off to the exhaust channel.

JP 2007-198310A is a patent document which may be related to the present disclosure.

SUMMARY

In the internal combustion engine disclosed in JP 2007-198310A, in a duration in which the EGR valve is closed, a condensed water in the EGR channel is not evaporated and is blown off to the exhaust channel. Therefore, in the internal combustion engine disclosed in JP 2007-198310A, there is a concern that the condensed water that has been blown off to the exhaust channel from the EGR channel in the duration in which the EGR valve is closed may generate an adverse effect at locations, such as the exhaust channel.

Further, in the internal combustion engine disclosed in JP 2007-198310A, there is a concern that, since the condensed water in the EGR channel is not evaporated in the duration in which the EGR valve is closed, a part of the condensed water that has not been blown off may remain in the EGR channel. If an operation to open the EGR valve is started with the condensed water remaining in the EGR channel, there is a concern that the condensed water that has moved to the intake channel from the EGR channel after the operation to open the EGR valve is started may generate an adverse effect at locations, such as the intake channel.

The present disclosure has been made in view of the problem described above, and an object of the present disclosure is to provide a control apparatus for an internal combustion engine that can reduce concern that a condensed water that has moved to the outside of an EGR channel from the inside of the EGR channel may generate an adverse effect on the outside of the EGR channel.

The present disclosure provides a control apparatus for an internal combustion engine that includes:

an internal combustion engine main body;

an intake channel connected to the internal combustion engine main body;

an exhaust channel connected to the internal combustion engine main body;

an EGR channel configured to recirculate, into the intake channel, a part of exhaust gas that flows in the exhaust channel; and an EGR valve installed in the EGR channel and configured to adjust an amount of EGR gas that recirculates into the intake channel through the EGR channel, the control apparatus is configured, when the internal combustion engine is in a warm-up process and when an intake air flow rate that is a flow rate of air supplied to the internal combustion engine main body is less than or equal to a predetermined value, to open the EGR valve with a minute opening degree that is an opening degree smaller than a minimum opening degree of the EGR valve with which a condensed water in an exhaust-channel-side portion that is a portion of the EGR channel on a side closer to the exhaust channel relative to the EGR valve flows into an intake-channel-side portion that is a portion of the EGR channel on a side closer to the intake channel relative to the EGR valve.

Namely, in the control apparatus for an internal combustion engine of the present disclosure, the condensed water in the EGR channel is prevented from being not evaporated and being blown off to the exhaust channel during closing of the EGR valve, contrary to the internal combustion engine disclosed in JP 2007-198310A. That is, in the control apparatus of the present disclosure, during an engine warm-up process, the EGR valve is opened with the an opening degree (minute opening degree) smaller than the minimum opening degree of the EGR valve with which the condensed water in the portion of the EGR channel on the side closer to the exhaust channel relative to the EGR valve (exhaust-channel-side portion) flows into the portion of the EGR channel on the side closer to the intake channel relative to the EGR valve (intake-channel-side portion).

More specifically, in the control apparatus of the present disclosure, the EGR valve is opened with the minute opening degree during the engine warm-up process under an operational condition in which, even if the EGR valve is opened with the minute opening degree, the condensed water in the exhaust-channel-side portion does not flow into the intake-channel-side portion through the EGR valve (that is, operational condition in which the pressure difference between the exhaust-channel-side portion and the intake-channel-side portion is substantially zero), in other words, during the engine warm-up process under an operational condition in which the flow rate of air supplied to the internal combustion engine main body (intake air flow rate) is less than or equal to the predetermined value.

As a result, in the control apparatus of the present disclosure, the condensed water in the exhaust-channel-side portion does not flow into the intake-channel-side portion, and a convective flow is generated in the EGR channel (the exhaust-channel-side portion and the intake-channel-side portion) due to a temperature difference between a low temperature fresh air in the intake-channel-side portion and a high temperature EGR gas (burned gas) in the exhaust-channel-side portion. More specifically, a part of the EGR gas in the exhaust-channel-side portion moves to the intakechannel-side portion through the EGR valve, and a part of the fresh air in the intake-channel-side portion is introduced into the exhaust-channel-side portion through the EGR valve.

Thus, in the control apparatus of the present disclosure, when the engine is in the warm-up process and the intake air flow rate is less than or equal to the predetermined value, with the fresh air introduced in the exhaust-channel-side portion from the intake-channel-side portion through the EGR valve, the concentration of the EGR gas in the exhaust-channel-side portion is reduced and the condensed water in the exhaust-channel-side portion is evaporated.

Accordingly, as compared with an example in which the condensed water in the exhaust-channel-side portion is not evaporated, the control apparatus of the present disclosure can reduce concern that the condensed water that has moved from the inside of the EGR channel to the outside of the EGR channel may generate an adverse effect on the outside of the EGR channel.

In the control apparatus of the present disclosure, the control apparatus may further include an integrated fresh air introduction amount calculation section configured to calculate an integrated fresh air introduction amount that is an integrated amount of fresh air introduced into the exhaust-channel-side portion from the intake-channel-side portion through the EGR valve which is opened with the minute opening degree. Also, the control apparatus may be configured, when the internal combustion engine is in the warm-up process and when the intake air flow rate is less than or equal to the predetermined value, to open the EGR valve with the minute opening degree during a time period required for the integrated fresh air introduction amount calculated by the integrated fresh air introduction calculation section to reach an evaporation necessary amount that is an amount necessary to evaporate the condensed water in the exhaust-channel-side portion.

Namely, in the control apparatus of the present disclosure, the EGR valve is opened with the minute opening degree during the time period required for the integrated fresh air introduction amount (that is an integrated amount of the fresh air introduced in the exhaust-channel-side portion) to reach the evaporation necessary amount that is an amount required to evaporate the condensed water in the exhaust-channel-side portion.

Therefore, as compared with an example in which the fresh air is not introduced into the exhaust-channel-side portion until the integrated fresh air introduction amount reaches the evaporation necessary amount, the control apparatus of the present disclosure can decrease the condensed water that remains in the exhaust-channel-side portion without being evaporated and can reduce concern that the condensed water that has moved from the inside of the EGR channel to the outside of the EGR channel may generate an adverse effect on the outside of the EGR channel.

In the control apparatus of the present disclosure, the control apparatus may further include:

a wall temperature estimation section configured to estimate an wall temperature of the EGR channel; and an evaporation time calculation section configured to calculate an evaporation time required for completion of evaporation of the condensed water in the exhaust-channel-side portion.

Also, the control apparatus may be configured, after the integrated fresh air introduction amount reaches the evaporation necessary amount and after the wall temperature estimated by the wall temperature estimation section becomes higher than a dew point of the condensed water in the exhaust-channel-side portion, to suspend a EGR valve normal drive, by which the EGR valve is driven in such a manner that a part of the exhaust gas that flows in the exhaust channel is recirculated into the intake channel through the EGR valve, until the evaporation time calculated by the evaporation time calculation section elapses.

Namely, in the control apparatus of the present disclosure, the EGR valve normal drive, by which the EGR valve is driven in such a manner that a part of the exhaust gas that flows in the exhaust channel is recirculated into the intake channel through the EGR valve, is not started and suspended during a time period required for the evaporation time (that is a time required for completion of the evaporation of the condensed water in the exhaust-channel-side portion) to elapse.

Therefore, the control apparatus of the present disclosure can reduce concern that, as a result of the condensed water flowing into the intake channel through the EGR valve after the EGR valve normal drive is started under a condition in which the condensed water remains in the exhaust-channel-side portion, the condensed water may generate an adverse effect on some parts of the internal combustion engine, such as the intake channel.

The control apparatus for an internal combustion engine of the present disclosure can reduce concern that a condensed water that has moved to the outside of an EGR channel from the inside of the EGR channel may generate an adverse effect on the outside of the EGR channel.

BRIEF DESCRIPTION OF THE DRAWINGS

FIGS. 5A to 5D are time charts for an example of an engine system to which the control apparatus of the internal combustion engine according to the first embodiment is applied.

DETAILED DESCRIPTION

Figure 1A:
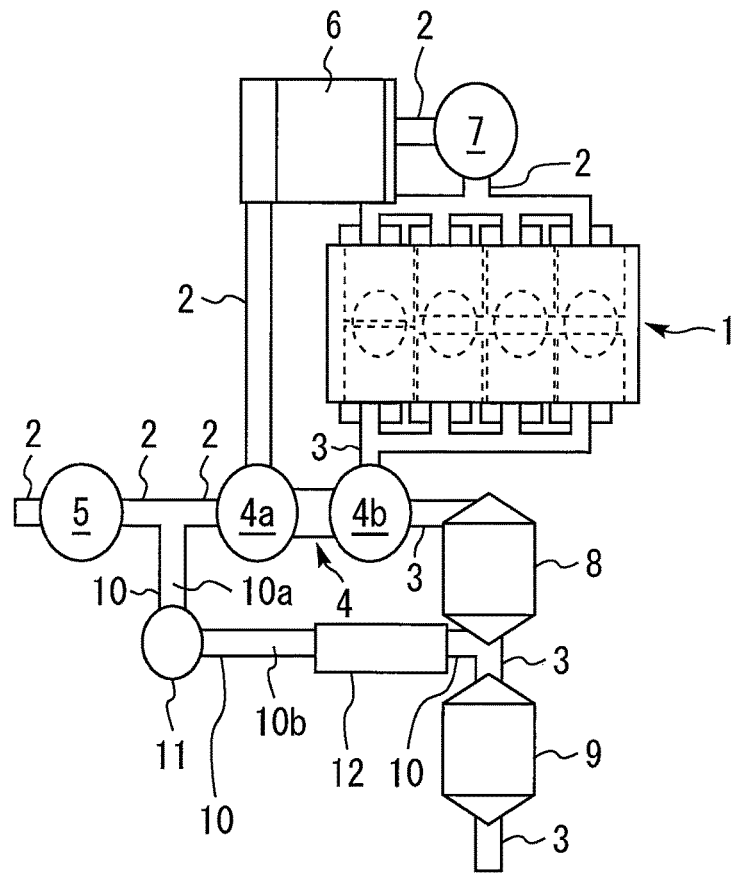
FIGS. 1A and 1B are schematic views that illustrate an example of an engine system to which a control apparatus for an internal combustion engine according to a first embodiment is applied.
Figure 1B:
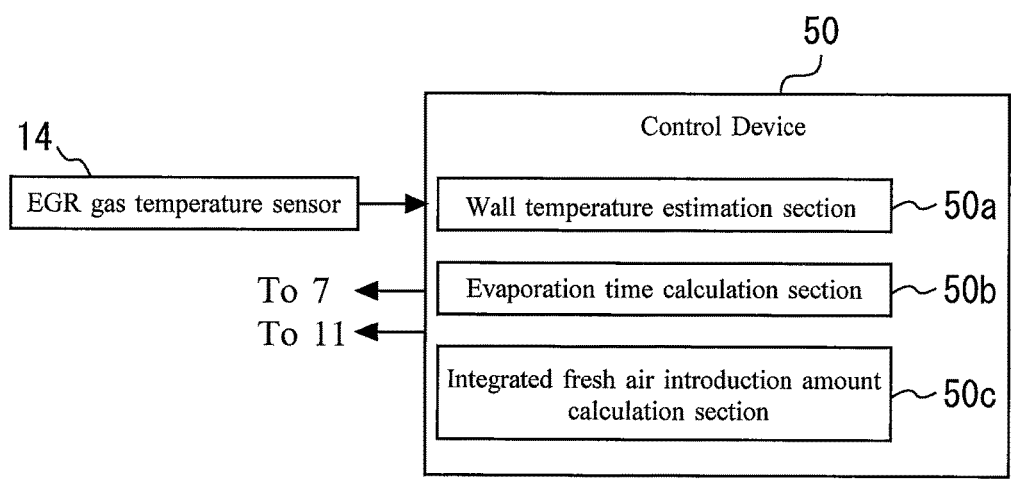

In the following, a first embodiment according to a control apparatus for an internal combustion engine of the present disclosure will be described. FIGS. 1A and 1B are schematic views that illustrate an example of an engine system to which the control apparatus for the internal combustion engine according to the first embodiment is applied.

In the example shown in FIG. 1A, an intake channel 2 and an exhaust channel 3 are connected to an internal combustion engine main body 1. In the intake channel 2, a compressor 4*a* of a supercharging device 4 is installed. In the exhaust channel 3, a turbine 4*b* of the supercharging device 4 is installed. That is, in the example shown in FIG. 1A, intake air pressurized by the compressor 4*a* of the supercharging device 4 is supplied to the internal combustion engine main body 1.

Also, in the example shown in FIG. 1A, an air cleaner 5 is installed at a portion of the intake channel 2 on the upstream side of the compressor 4*a*. An intercooler 6 is installed at a portion of the intake channel 2 on the downstream side of the compressor 4*a*. A throttle valve 7 is installed at a portion of the intake channel 2 on the downstream side of the intercooler 6.

Further, in the example shown in FIG. 1A, exhaust gas purifying devices 8 and 9 are respectively installed at portions of the exhaust channel 3 on the downstream side of the turbine 4*b*. As each of the exhaust gas purifying devices 8 and 9, a device configured by a filter, a catalyst (such as an NOx catalyst, an oxidation catalyst or a three-way catalyst), or a proper combination thereof can be used.

In the example shown in FIG. 1A, an EGR channel 10 configured to recirculate, into the intake channel 2, a part of the exhaust gas that flows in the exhaust channel 3 is provided. More specifically, in the example shown in FIG. 1A, a portion of the intake channel 2 between the air cleaner 5 and the compressor 4*a* and a portion of the exhaust channel 3 between the exhaust gas purifying device 8 and the exhaust gas purifying device 9 are connected to each other with the EGR channel 10 interposed therebetween. In the EGR channel 10, an EGR valve 11 configured to adjust the amount of the EGR gas that recirculates into the intake channel 2 through the EGR channel 10 is installed. In addition, an EGR cooler 12 is installed at a portion (that is, an exhaust-channel-side portion 10*b*) of the EGR channel 10 on the side closer to the exhaust channel 3 relative to the EGR valve 11.

In a warm-up process in the cold state of the internal combustion engine (that is, engine warm-up process), in a duration in which the EGR valve 11 (see FIG. 1A) is closed, a condensed water is produced in the EGR channel 10 (see FIG. 1A) (more specifically, in the exhaust-channel-side portion 10*b* (see FIG. 1A) due to a pulsation generated in the exhaust channel 3 (see FIG. 1A). If this kind of condensed water flows into the exhaust channel 3 (see FIG. 1A) from the EGR channel 10, there is a concern that the condensed water may adversely affect a device, such as an exhaust gas purifying device 9 (see FIG. 1A).

In addition, if an operation to open the EGR valve 11 is started under a condition where the condensed water that is produced in the duration in which the EGR valve 11 is closed remains in the EGR channel 10 (more specifically, in the exhaust-channel-side portion 10*b*), there is a concern that the condensed water which has flown into the intake channel 2 from the EGR channel 10 after the start of the operation to open the EGR valve 11 may adversely affect devices, such as the compressor 4*a* (see FIG. 1A) and the internal combustion engine main body 1 (see FIG. 1A).

In view of the points described above, in the example shown in FIG. 1A to which the control apparatus for the internal combustion engine according to the first embodiment is applied, contrary to the internal combustion engine disclosed in JP 2007-198310A, the condensed water produced in the portion of the EGR channel 10 on the side closer to the exhaust channel 3 relative to the EGR valve 11 (that is, the exhaust-channel-side portion 10*b*) is not blown off to the exhaust channel 3, and the condensed water produced in the exhaust-channel-side portion 10*b* is evaporated instead. More specifically, in order to reduce the concentration of the EGR gas in the exhaust-channel-side portion 10*b* (that is, to decrease the dew point thereof) to evaporate the condensed water, a part of the fresh air in the portion of the EGR channel 10 on the side closer to the intake channel 2 relative to the EGR valve 11 (that is, an intake-channel-side portion 10*a*) is introduced into the exhaust-channel-side portion 10*b* through the EGR valve 11 with a method described later in detail.

Also, in the example shown in FIG. 1B, an EGR gas temperature sensor 14 configured to detect the temperature of the EGR gas in the EGR channel 10 is installed in the exhaust-channel-side portion 10*b*, for example. The output signals of the EGR gas temperature sensor 14 are inputted to a control device (ECU) 50. A wall temperature estimation section 50*a* of the control device 50 can estimate the wall temperature of the exhaust-channel-side portion 10*b* of the EGR channel 10 on the basis of the output signals of the EGR gas temperature sensor 14.

Further, in the example shown in FIGS. 1A and 1B, an engine cooling water channel (not shown in the drawings) is arranged around the intake-channel-side portion 10*a*. This engine cooling water channel serves as a warming device for warming the intake-channel-side portion 10*a*. Moreover, a cooling water temperature sensor (not shown) for detecting the temperature of the cooling water in the engine cooling water channel is provided. The output signals of the cooling water temperature sensor is inputted to the control device 50. The wall temperature estimation section 50*a* of the control device 50 can estimate the wall temperature of the intake-channel-side portion 10*a* of the EGR channel 10 on the basis of the output signals of the cooling water temperature sensor.

In the example shown in FIG. 1B to which the control apparatus of the internal combustion engine according to the first embodiment is applied, the wall temperature of the EGR channel 10 is estimated by the wall temperature estimation section 50*a* on the basis of the output signals of the EGR gas temperature sensor 14 or the output signals of the cooling water temperature sensor. However, in another example, the wall temperature of the EGR channel 10 may also be estimated instead on the basis of the output signals, of a wall temperature sensor (not shown) for detecting the wall surface of the EGR channel 10.

Figure 2:
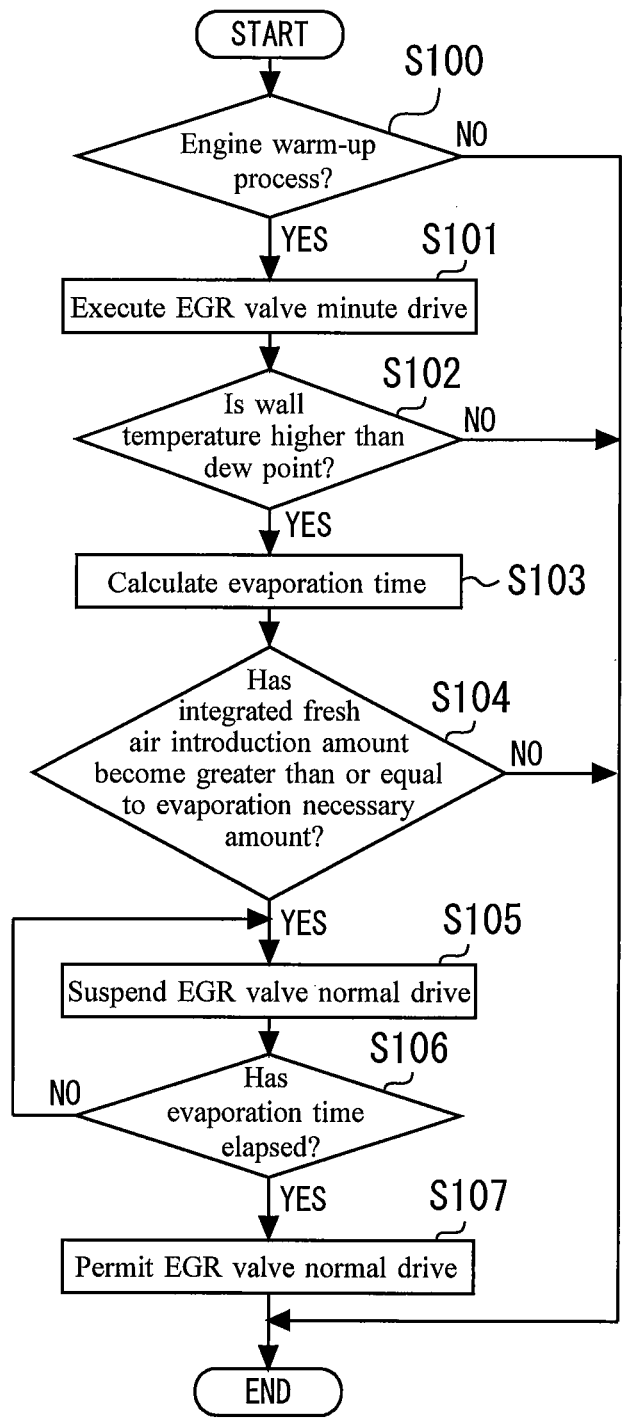
FIG. 2 is a flowchart for schematically explaining the control of an EGR valve executed by the control apparatus of the internal combustion engine according to the first embodiment to evaporate a condensed water in an exhaust-channel-side portion.

FIG. 2 is a flowchart for schematically explaining the control of the EGR valve 11 executed by the control apparatus of the internal combustion engine according to the first embodiment to evaporate the condensed water in the exhaust-channel-side portion 10*b*.

When the control shown in FIG. 2 is started, it is first determined by the control device 50 (see FIG. 1B) in step S100 whether or not the internal combustion engine is in the warm-up process at a cold state (that is, engine warm-up process). If the determination result is positive, the processing proceeds to step S101. If, on the other hand, the determination result is negative, the control shown in FIG. 2 is ended. Whether or not the engine is in the warm-up process can be determined, for example, on the basis of the cooling water temperature or a lubricant oil temperature.

In step S101, an EGR valve minute drive by which the EGR valve 11 is opened with a minute opening degree is executed. The "minute opening degree" will be described later in detail.

Figure 3:
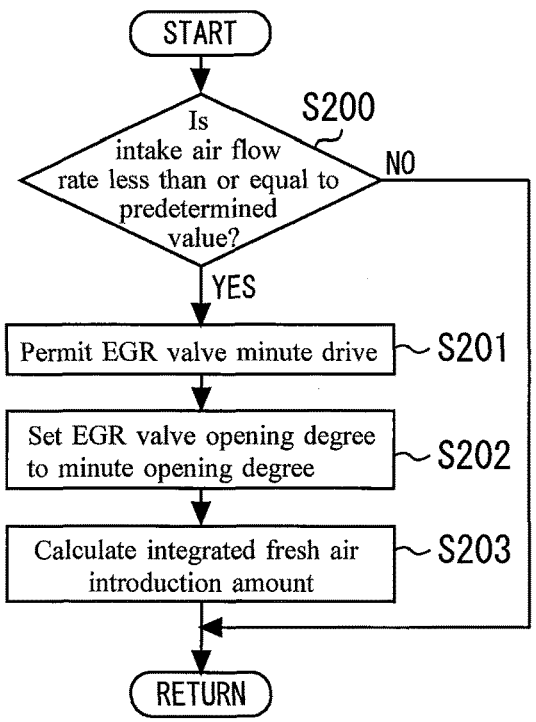
FIG. 3 is a flowchart for schematically explaining the control of an EGR valve minute drive that is executed in step S101 shown in FIG. 2.

FIG. 3 is a flowchart for schematically explaining the control of the EGR valve minute drive that is executed in step S101 shown in FIG. 2.

When the control of the EGR valve minute drive shown in FIG. 3 is started, first, it is determined by the control device 50 (see FIG. 1B) in step S200 whether or not the flow rate (intake air flow rate) of air that is supplied to the internal combustion engine main body 1 (see FIG. 1A) is less than or equal to a predetermined value. If the determination result is positive, the processing proceeds to step S201. If, on the other hand, the determination result is negative, the control shown in FIG. 3 is ended. Whether or not the intake air flow rate is less than or equal to the predetermined value can be determined, for example, on the basis of parameters, such as the engine speed and the rotational speed of the supercharging device 4 (see FIG. 1A).

In the example shown in FIG. 3, for example, a value of the flow rate of air supplied to the internal combustion engine main body 1 (that is, intake air flow rate) in an operating condition in which a differential pressure between the exhaust-channel-side portion 10b (see FIG. 1A) and the intake-channel-side portion 10a (see FIG. 1A) is substantially zero is set as the predetermined value in step S200.

When, since the differential pressure between the exhaust-channel-side portion 10b and the intake-channel-side portion 10a is substantially zero, the determination result of step S200 is positive, the exhaust gas that flows through the exhaust channel (see FIG. 1A) is hardly recirculated into the intake channel 3 (see FIG. 1A) through the EGR channel 10 (see FIG. 1A) even if EGR valve (see FIG. 1A) is opened.

Therefore, EGR valve minute drive is permitted in step S201 and, for example, a flag for indicating the permission is turned ON.

Next, in step S202, the opening degree of the EGR valve 11 (see FIG. 1A) is set to a minute opening degree.

Explanation is made below on the "minute opening degree".

In the engine warm-up process (that is, when the determination result of step S100 in FIG. 2 is positive, the condensed water is present at the exhaust-channel-side portion 10b (see FIG. 1A).

If the opening degree of the EGR valve 11 is set so as to have a value within a range from X1 (>0) [%] through 100 [%] when the condensed water is present at the exhaust-channel-side portion 10b, there is a concern that, even if the differential pressure between the exhaust-channel-side portion 10b and the intake-channel-side portion 10a (see FIG. 1A) is substantially zero (that is, even if the intake air flow rate is less than or equal to the predetermined value in step S200 in FIG. 3), the condensed water in the exhaust-channel-side portion 10b may flow into the intake-channel-side portion 10a, due to a pulsation in the exhaust channel 3 (see FIG. 1A), through the EGR valve 11 which is open.

More specifically, X1 [%] to 100 [%] corresponds to an opening degree of the EGR valve 11 where the condensed water in the exhaust-channel-side portion 10b flows into the intake-channel-side portion 10a, and X1 [%] corresponds to a minimum opening degree of the EGR valve 11 with which the condensed water in the exhaust-channel-side portion 10b flows into the intake-channel-side portion 10a.

If, on the other hand, the opening degree of the EGR valve 11 is set to a minute opening degree X2 [%] (0<X2<X1) that is smaller than the aforementioned minimum opening degree X1 [%] when the engine is in the warm-up process and the intake air low rate is less than or equal to the predetermined value in step S200 shown in FIG. 3, the condensed water in the exhaust-channel-side portion 10b does not flow into the intake-channel-side portion 10a even if a pressure pulsation occurs in the exhaust channel 3.

Accordingly, in the example shown in FIGS. 2 and 3 to which the control apparatus of the internal combustion engine according to the first embodiment is applied, in step S202, the opening degree of the EGR valve 11 is set to the minute opening degree X2 [%] as described above, and the EGR valve 11 is thereby opened with the minute opening degree X2 [%].

When the EGR valve 11 (see FIG. 1A) is opened with the minute opening degree X2 [%] in step S202, the condensed water in the exhaust-channel-side portion 10b (see FIG. 1A) does not flow into the intake-channel-side portion 10a (see FIG. 1A), and a convective flow is generated in the exhaust-channel-side portion 10b and the intake-channel-side portion 10a due to a temperature difference between a low temperature fresh air in the intake-channel-side portion 10a and a high temperature EGR gas (burned gas) in the exhaust-channel-side portion 10b. More specifically, a part of the EGR gas in the exhaust-channel-side portion 10b moves to the intake-channel-side portion 10a through the EGR valve 11, and a part of the fresh air in the intake-channel-side portion 10a is introduced into the exhaust-channel-side portion 10b through the EGR valve 11.

As a result, in the example shown in FIGS. 2 and 3 to which the control apparatus of the internal combustion engine according to the first embodiment is applied, when the engine is in the warm-up process (that is, when the determination result of step S100 in FIG. 2 is positive) and when the intake air flow rate is less than or equal to the predetermined value (that is, when the determination result of step S200 in FIG. 3 is positive), the fresh air introduced into the exhaust-channel-side portion 10b from the intake-channel-side portion 10a through the EGR valve causes the concentration of the EGR gas in the exhaust-channel-side portion 10b to be reduced and causes the condensed water in the exhaust-channel-side portion 10b to be evaporated.

Therefore, as compared with an example in which the condensed water in the exhaust-channel-side portion 10b is not evaporated, the example shown in FIGS. 2 and 3 to which the control apparatus of the internal combustion engine according to the first embodiment is applied can reduce concern that the condensed water that has moved from the inside of the EGR channel 10 to the outside of the EGR channel 10 may generate an adverse effect on the outside of the EGR channel 10.

An evaporation necessary amount Q that is an amount of fresh air necessary to evaporate the condensed water in the exhaust-channel-side portion 10b (see FIG. 1A) can be calculated on the basis of parameters, such as the volume V of the exhaust-channel-side portion 10b. In more detail, in the example shown in FIGS. 1A and 1B of an engine system to which the control apparatus of the internal combustion engine according to the first embodiment is applied, the evaporation necessary amount Q is calculated on the basis of the following equations 1, 2 and 3 and is stored in advance in a memory, such as a ROM (not shown), of the control device 50.

$$T_{trg} - T_0 = 237.3 * \log(\Delta e / 6.11) / (7.5 * \log 10 + \log(6.11 / \Delta e)) \quad \text{(Equation 1)}$$

$$\Delta e = 6.11 * 10^{\wedge}(7.5 * t / (273.3 + T)) * \Delta Rh / 100 \quad \text{(Equation 2)}$$

$$Q = \Delta Rh / (100 - \Delta Rh) * V \quad \text{(Equation 3)}$$

In the above-mentioned equations 1, 2 and 3:

$T_{trg}$ is a target dew point; $T_0$ is the current dew point;

$\Delta Rh$ is an amount of relative humidity change that is necessary to decrease the temperature from the current dew point $T_0$ to the target dew point $T_{trg}$;

e is a water vapor pressure;

T is the temperature of the EGR gas in the EGR channel 10 or the wall temperature of the EGR channel 10;

V is the volume of the exhaust-channel-side portion 10b; and

Q is a fresh air supply amount (evaporation necessary amount) necessary to reduce the humidity in the volume V by the relative humidity change amount ΔRh.

It is assumed that the relative humidity of the gas in the exhaust channel 3 is 100% (100% EGR ratio).

Moreover, when the engine is in the warm-up process (that is, when the determination result of step S100 in FIG. 2 is positive) and when the intake air flow rate is less than or equal to the predetermined value (that is, when the determination result of step S200 in FIG. 3 is positive), a fresh air introduction amount Q1 [g/s] per unit time that is introduced in the exhaust-channel-side portion 10b (see FIG. 1A) from the intake-channel-side portion 10a (see FIG. 1A) through the EGR valve 11 (see FIG. 1A) which is opened with the minute opening degree X2 [%] differs depending on the temperature of the EGR gas (burned gas) in the exhaust-channel-side portion 10b.

Figure 4:
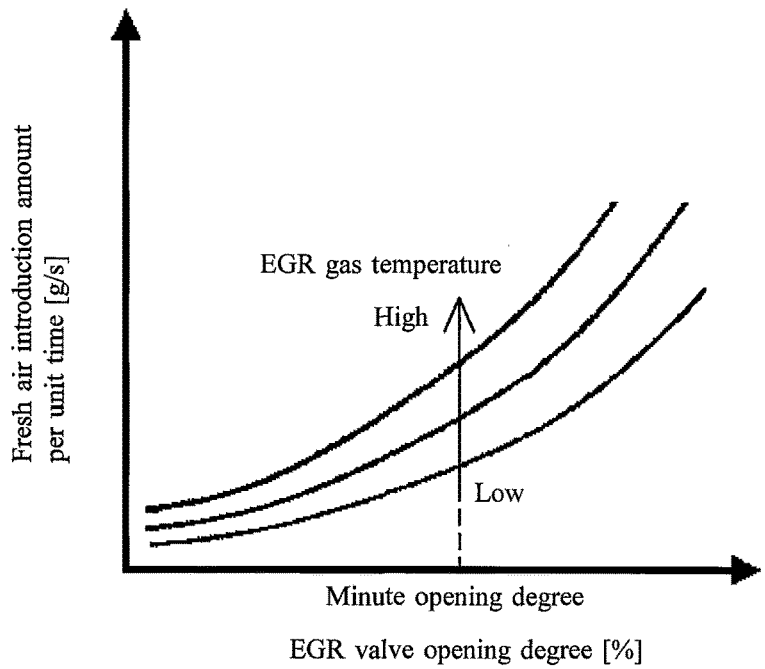
FIG. 4 is a graph showing a relation between: the opening degree [%] of the EGR valve when the engine is in a warm-up process and an intake air flow rate is less than or equal to a predetermined value; the temperature of the EGR gas in the exhaust-channel-side portion; and a fresh air introduction amount Q1 [g/s] per unit time that is introduced into the exhaust-channel-side portion from an intake-channel-side portion.

FIG. 4 is a graph showing a relation between: the opening degree [%] of the EGR valve 11 when the engine is in the warm-up process and the intake air flow rate is less than or equal to the predetermined value; the temperature of the EGR gas in the exhaust-channel-side portion 10b; and the fresh air introduction amount Q1 [g/s] per unit time that is introduced into the exhaust-channel-side portion 10b from the intake-channel-side portion 10a.

As shown in FIG. 4, when the opening degree of the EGR valve 11 is set to the minute opening degree, with an increase of the temperature of the EGR gas in the exhaust-channel-side portion 10b, the convective flow velocity increases and, as a result, the fresh air introduction amount Q1 [g/s] per unit time that is introduced into the exhaust-channel-side portion 10b from the intake-channel-side portion 10a increases.

Returning to the explanation on FIG. 3, in step S203, an integrated fresh air introduction amount Q2 (=Q1*P), which is a product of the fresh air introduction amount Q1 [g/s] per unit time shown in FIG. 4 and a duration (integration time period) P of control that opens the EGR valve 11 (see FIG. 1A) with the minute opening degree X2 [%], is calculated by an integrated fresh air introduction amount calculation section 50c (see FIG. 1B) of the control device 50 (see FIG. 1B).

In the example shown in FIGS. 2 and 3, the fresh air introduction amount Q1 [g/s] per unit time and the minute opening degree X2 [%] are determined in advance and stored in the memory, such as ROM (not shown), of the control device 50 (see FIG. 1B).

In other words, in the example shown in FIGS. 1A and 1B of an engine system to which the control apparatus of the internal combustion engine according to the first embodiment is applied, in order to evaporate the condensed water in the exhaust-channel-side portion 10b, it is required to execute the control that opens the EGR valve 11 with the minute opening degree (that is, to execute the processing of step S202 in FIG. 3) until the integrated fresh air introduction amount Q2 reaches the evaporation necessary amount Q.

In the example shown in FIGS. 2 and 3, the processing of step S102 in FIG. 2 is executed following step S203 in FIG. 3. In step S102, it is determined by the control device 50 (see FIG. 1B) whether or not the wall temperature of the EGR channel 10 (see FIG. 1A) estimated by the wall temperature estimation section 50a (see FIG. 1B) is higher than the dew point of the EGR gas (dew point of the condensed water in the exhaust-channel-side portion 10b (see FIG. 1A)). If the determination result of step S102 is positive, the processing proceeds to step S103. If, on the other hand, the determination result of step S102 is negative, the control shown in FIG. 2 is ended. The dew point of the EGR gas is stored in advance in the memory, such as a ROM (not shown), of the control device 50.

In step S103, an evaporation time calculation section 50b (see FIG. 1B) of the control device 50 (see FIG. 1B) calculates an evaporation time tr that is required for completion of evaporation of the condensed water in the exhaust-channel-side portion 10b (see FIG. 1A).

Namely, in the example shown in FIGS. 1A and 1B of an engine system to which the control apparatus of the internal combustion engine according to the first embodiment is applied, it is taken into consideration that, in order to complete the evaporation of the condensed water in the exhaust-channel-side portion 10b, a passage of a certain time (more specifically, evaporation time tr) is required after the integrated fresh air introduction amount Q2 reaches the evaporation necessary amount Q.

In more detail, the evaporation time tr required for completion of evaporation of the condensed water in the exhaust-channel-side portion 10b is calculated on the basis of the following equation 4.

$$dm = D(d\rho/dx)dFdtr \quad \text{(Equation 4) (Fick's laws of diffusion)}$$

In the above-mentioned equation 4:
m is an evaporation mass;
D is a diffusion coefficient;
ρ is a water vapor partial pressure;
x is a distance from the surface of the condensed water;
F is the area of a plane perpendicular to x; and
tr is the evaporation time.

Returning to the explanation on FIG. 2, in step S104, it is determined by the control device 50 (see FIG. 1B) whether or not the integrated fresh air introduction amount Q2 calculated in step S203 has become greater than or equal to the evaporation necessary amount Q (that is, whether or not the integrated fresh air introduction amount Q2 has reached the evaporation necessary amount Q). If the determination result of step S104 is positive, the processing proceeds to step S105. If, on the other hand, the determination result of step S104 is negative, the control shown in FIG. 2 is ended.

Even when the fresh air with the evaporation necessary amount Q is supplied into the exhaust-channel-side portion 10b (see FIG. 1A), if an EGR valve normal drive of the EGR valve 11, according to which the EGR valve 11 is driven in such a manner that a part of the exhaust gas that flows in the exhaust channel 3 (see FIG. 1A) is recirculated into the intake channel 2 (see FIG. 1A) through the EGR valve 11 (see FIG. 1A), is started before completion of evaporation of the condensed water in the exhaust-channel-side portion 10b, there is a concern that the condensed water in the exhaust-channel-side portion 10b may flow into the intake channel 2 through the EGR valve 11 after the start of the EGR valve normal drive and may generate an adverse effect on some parts of the internal combustion engine, such as the compressor 4a (see FIG. 1A) and the internal combustion engine main body 1 (see FIG. 1A).

In view of the point described above, in the example shown in FIG. 2 to which the control apparatus of the internal combustion engine according to the first embodiment is applied, in step S105, the control device 50 suspends execution of the EGR valve normal drive.

Next, in step S106, after the wall temperature of the EGR channel 10 (see FIG. 1A) has become higher than the dew point of the EGR gas (that is, the determination result of step S102 has become positive) and the integrated fresh air introduction amount Q2 has reached the evaporation necessary amount Q (that is, the determination result of step S104 has become positive), it is determined by the control device 50 (see FIG. 1B) whether or not the evaporation time tr has elapsed.

If the evaporation time tr has elapsed after the wall temperature of the EGR channel 10 has become higher than the dew point of the EGR gas and if the evaporation time tr has elapsed after the integrated fresh air introduction amount Q2 has reached the evaporation necessary amount Q, the processing proceeds to step S107.

If the evaporation time tr has not yet elapsed after the wall temperature of the EGR channel 10 has become higher than the dew point of the EGR gas or the evaporation time tr has not yet elapsed after the integrated fresh air introduction amount Q2 has reached the evaporation necessary amount Q, the processing returns to step S105 to continue suspending the execution of the EGR valve normal drive.

In other words, in the example shown in FIG. 2 to which the control apparatus of the internal combustion engine according to the first embodiment is applied, in steps S105 and S106, the execution of the EGR valve normal drive is suspended until the evaporation time tr elapses after the wall temperature of the EGR channel 10 (see FIG. 1A) has become higher than the dew point of the EGR gas, and the execution of the EGR valve normal drive is suspended until the evaporation time tr elapses after the integrated fresh air introduction amount Q2 has reached the evaporation necessary amount Q.

In step S107 in FIG. 2, the EGR valve normal drive is permitted, and, for example, a flag for indicating the permission is turned ON. Also, the EGR valve normal drive is started and a part of the exhaust gas that flows in the exhaust channel 3 (see FIG. 1A) is recirculated into the intake channel 2 (see FIG. 1A) through the EGR valve 11 (see FIG. 1A).

FIGS. 5A to 5D are time charts for an example of the engine system to which the control apparatus of the internal combustion engine according to the first embodiment is applied. In more detail, FIG. 5A indicates the waveform of the engine speed, FIG. 5B indicates the waveform of the wall temperature of the EGR channel 10 (see FIG. 1A), FIG. 5C indicates the status of the EGR valve minute drive, and FIG. 5D indicates the status of the EGR valve normal drive.

In the example shown in FIGS. 5A to 5D, at or before a time point t1, the determination result of step S100 (see FIG. 2) becomes positive. Also, as shown in FIG. 5A, since the engine speed is higher than a threshold value NETH, it is determined in step S200 (see FIG. 3) that the intake air flow rate is greater than the predetermine value (that is, the determination result of step S200 becomes negative). As a result, as shown in FIG. 5C, the EGR valve minute drive (step S202 in FIG. 3) is not executed (turns OFF). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t1 to t2, the determination result of step S100 (see FIG. 2) becomes positive. Also, as shown in FIG. 5A, since the engine speed is lower than or equal to the threshold value NETH (in more detail, the engine speed shifts to an idling engine speed, for example), it is determined in step S200 (see FIG. 3) that the intake air flow rate is less than or equal to the predetermine value (that is, the determination result of step S200 becomes positive). As a result, as shown in FIG. 5C, the EGR valve minute drive (step S202 in FIG. 3) is executed (turns ON). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t2 to t3, the determination result of step S100 (see FIG. 2) becomes positive. Also, as shown in FIG. 5A, since the engine speed is higher than the threshold value NETH, it is determined in step S200 (see FIG. 3) that the intake air flow rate is greater than the predetermine value (that is, the determination result of step S200 becomes negative). As a result, as shown in FIG. 5C, the EGR valve minute drive (step S202 in FIG. 3) is not executed (turns OFF). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t3 to t4, the determination result of step S100 (see FIG. 2) becomes positive. Also, as shown in FIG. 5A, since the engine speed is lower than or equal to the threshold value NETH, it is determined in step S200 (see FIG. 3) that the intake air flow rate is less than or equal to the predetermine value (that is, the determination result of step S200 becomes positive). As a result, as shown in FIG. 5C, the EGR valve minute drive (step S202 in FIG. 3) is executed (turns ON). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t4 to t5, the determination result of step S100 (see FIG. 2) becomes positive. Also, as shown in FIG. 5A, since the engine speed is higher than the threshold value NETH, it is determined in step S200 (see FIG. 3) that the intake air flow rate is greater than the predetermine value (that is, the determination result of step S200 becomes negative). As a result, as shown in FIG. 5C, the EGR valve minute drive (step S202 in FIG. 3) is not executed (turns OFF). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t5 to t6, the determination result of step S100 (see FIG. 2) becomes positive. Also, as shown in FIG. 5A, since the engine speed is lower than or equal to the threshold value NETH, it is determined in step S200 (see FIG. 3) that the intake air flow rate is less than or equal to the predetermine value (that is, the determination result of step S200 becomes positive). As a result, as shown in FIG. 5C, the EGR valve minute drive (step S202 in FIG. 3) is executed (turns ON). Also, as shown in FIG. 5B, since the wall temperature of the EGR channel 10 (see FIG. 1A) is lower than the dew point T1 of the EGR gas, the determination result of step S102

(see FIG. 2) becomes negative. As a result, as shown in FIG. 5D, the EGR valve normal drive (step S107 in FIG. 2) is not executed (turns OFF).

In the example shown in FIGS. 5A to 5D, during a time period t6 to t7, the determination result of step S100 (see FIG. 2) becomes positive. Also, as shown in FIG. 5A, since the engine speed is higher than the threshold value NETH, it is determined in step S200 (see FIG. 3) that the intake air flow rate is greater than the predetermine value (that is, the determination result of step S200 becomes negative). As a result, as shown in FIG. 5C, the EGR valve minute drive (step S202 in FIG. 3) is not executed (turns OFF). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t7 to t8, the determination result of step S100 (see FIG. 2) becomes positive. Also, as shown in FIG. 5A, since the engine speed is lower than or equal to the threshold value NETH, it is determined in step S200 (see FIG. 3) that the intake air flow rate is less than or equal to the predetermine value (that is, the determination result of step S200 becomes positive). As a result, as shown in FIG. 5C, the EGR valve minute drive (step S202 in FIG. 3) is executed (turns ON). Also, as shown in FIG. 5B, since the wall temperature of the EGR channel 10 (see FIG. 1A) is lower than the dew point T1 of the EGR gas, the determination result of step S102 (see FIG. 2) becomes negative. As a result, as shown in FIG. 5D, the EGR valve normal drive (step S107 in FIG. 2) is not executed (turns OFF).

In the example shown in FIGS. 5A to 5D, at a time point t8, the determination result of step S100 (see FIG. 2) becomes positive. Also, as shown in FIG. 5A, since the engine speed is lower than or equal to the threshold value NETH, it is determined in step S200 (see FIG. 3) that the intake air flow rate is less than or equal to the predetermine value (that is, the determination result of step S200 becomes positive). As a result, as shown in FIG. 5C, the EGR valve minute drive (step S202 in FIG. 3) is executed (turns ON). Also, at the time point t8, as shown in FIG. 5B, the wall temperature of the EGR channel 10 (see FIG. 1A) is higher than the dew point T1 of the EGR gas. Thus, the determination result of step S102 (see FIG. 2) becomes positive.

Further, in the example shown in FIGS. 5A to 5D, at the time point t8, the integrated fresh air introduction amount Q2 (=Q1*P) reaches the evaporation necessary amount Q. In more detail, the duration (integration time period) P of the EGR valve minute drive is the total value of the time period t1 to t2, time period t3 to t4, time period t5 to t6 and time period t7 to t8. Thus, the determination result of step S104 (see FIG. 2) becomes positive.

Furthermore, in the example shown in FIGS. 5A to 5D, at the time point t8, the processing of step S105 (see FIG. 2) is executed, and the suspension of the EGR valve normal drive is started. Also, the determination result of step S106 (see FIG. 2) becomes negative. As a result, as shown in FIG. 5D, the EGR valve normal drive (step S107 in FIG. 2) is not executed (turns OFF).

In the example shown in FIGS. 5A to 5D, during a time period t8 to t9, the determination result of step S106 (see FIG. 2) becomes repeatedly negative and the processing of step S105 (see FIG. 2) is repeatedly executed.

Next, in the example shown in FIGS. 5A to 5D, at the time point t9, the evaporation time tr elapses from the time point (time point t8) at which the wall temperature of the EGR channel 10 (see FIG. 1A) becomes higher than the dew point of the EGR gas, and the evaporation time tr elapses from the time point (time point t8) at which the integrated fresh air introduction amount Q2 has reached the evaporation necessary amount Q. Thus, the determination result of step S106 (see FIG. 2) becomes positive. As a result, as shown in FIG. 5D, the EGR valve normal drive (step S107 in FIG. 2) is executed (turns ON).

In addition, the "ON" status of the "EGR valve normal drive" in FIG. 5D does not mean a full open status of the opening degree of the EGR valve (see FIG. 1A) but a status in which the opening degree of the EGR valve 11 varies depending on the operational state of the internal combustion engine.

In the example shown in FIGS. 5A to 5D, at or after the time point t9, the control (not shown) for the EGR valve normal drive is executed. In other words, after the evaporation time tr elapses (that is, the determination result of step S106 in FIG. 2 becomes positive) and the execution of the EGR valve normal drive is permitted (that is, the processing of step S107 in FIG. 2 is executed), the EGR valve minute drive is not executed even when the engine speed equals or falls below the threshold value NETH and the intake air flow rate equals or falls below the predetermined value.

As described above, in the engine system to which the control apparatus for the internal combustion engine according to the first embodiment is applied, the condensed water in the EGR channel 10 (see FIG. 1A) is prevented from being not evaporated and being blown off to the exhaust channel 3 (see FIG. 1A) during closing of the EGR valve 11 (see FIG. 1A), contrary to the internal combustion engine disclosed in JP 2007-198310A. That is, in the engine system, in step S202 (see FIG. 3), the EGR valve 11 (see FIG. 1A) is opened during the engine warm-up process (that is, when the determination result of step S100 in FIG. 2 becomes positive) with the minute opening degree X2 [%] that is smaller than the minimum opening degree X1 [%] of the EGR valve 11 with which the condensed water in the exhaust-channel-side portion 10b (FIG. 1A) flows into the intake-channel-side portion 10a (see FIG. 1A).

More specifically, in the engine system to which the control apparatus for the internal combustion engine according to the first embodiment is applied, in step S202, the EGR valve 11 is opened with the minute opening degree X2 (>0) [%] during the engine warm-up process under an operational condition in which, even if the EGR valve 11 is opened with the minute opening degree, the condensed water in the exhaust-channel-side portion 10b does not flow into the intake-channel-side portion 10a through the EGR valve 11 (that is, operational condition in which the pressure difference between the exhaust-channel-side portion 10b and the intake-channel-side portion 10a is substantially zero), in other words, during the engine warm-up process (that is, when the determination result of step S100 in FIG. 2 is positive) under an operational condition in which the intake air flow rate is less than or equal to the predetermined value (that is, when the determination result of step S200 in FIG. 3 is positive).

As a result, in the engine system to which the control apparatus for the internal combustion engine according to the first embodiment is applied, when the engine is in the warm-up process and the intake air flow rate is less than or equal to the predetermined value, with the fresh air introduced in the exhaust-channel-side portion 10b from the intake-channel-side portion 10a through the EGR valve 11, the concentration of the EGR gas in the exhaust-channelside portion 10b is reduced and the condensed water in the exhaust-channel-side portion 10b is evaporated.

Accordingly, as compared with an example in which the condensed water in the exhaust-channel-side portion 10b is not evaporated, the engine system to which the control apparatus for the internal combustion engine according to the first embodiment is applied can reduce concern that the condensed water that has moved from the inside of the EGR channel 10 to the outside of the EGR channel 10 may generate an adverse effect on the outside of the EGR channel 10.

Further, in the engine system to which the control apparatus for the internal combustion engine according to the first embodiment is applied, the EGR valve 11 (see FIG. 1A) is opened with the minute opening degree X2 [%] during the time period required for the integrated fresh air introduction amount Q2 (that is an integrated amount of the fresh air introduced in the exhaust-channel-side portion 10b (see FIG. 1A)) to reach the evaporation necessary amount Q that is an amount required to evaporate the condensed water in the exhaust-channel-side portion 10b (that is, during the sum of the time period t1 to t2, time period t3 to t4, time period t5 to t6, and time period t7 to t8 in the example shown in FIGS. 5A to 5D).

Therefore, as compared with an example in which the fresh air is not introduced into the exhaust-channel-side portion 10b until the integrated fresh air introduction amount Q2 reaches the evaporation necessary amount Q, the engine system to which the control apparatus for the internal combustion engine according to the first embodiment is applied can decrease the condensed water that remains in the exhaust-channel-side portion 10b without being evaporated and can reduce concern that the condensed water that has moved from the inside of the EGR channel 10 (see FIG. 1A) to the outside of the EGR channel 10 may generate an adverse effect on the outside of the EGR channel 10.

Furthermore, in the engine system to which the control apparatus for the internal combustion engine according to the first embodiment is applied, the EGR valve normal drive, by which the EGR valve 11 is driven in such a manner that a part of the exhaust gas that flows in the exhaust channel 3 (see FIG. 1A) is recirculated into the intake channel 2 (see FIG. 1A) through the EGR valve 11 (see FIG. 1A), is not started and suspended during a time period required for the evaporation time tr (that is a time required for completion of the evaporation of the condensed water in the exhaust-channel-side portion 10b (see FIG. 1A)) to elapse (that is, during the time period t8 to t9 in the example shown in FIGS. 5A to 5D).

Therefore, the engine system to which the control apparatus for the internal combustion engine according to the first embodiment is applied can reduce concern that, as a result of the condensed water flowing into the intake channel 2 through the EGR valve 11 after the EGR valve normal drive is started under a condition in which the condensed water remains in the exhaust-channel-side portion 10b, the condensed water may generate an adverse effect on some parts of the internal combustion engine, such as the intake channel 2.

In the example shown in FIGS. 5A to 5D, the integrated fresh air introduction amount Q2 (=Q1*P) reaches the evaporation necessary amount Q at the same time as that the wall temperature of the EGR channel 10 (see FIG. 1A) becomes higher than the dew point T1 of the EGR gas. However, the control apparatus for the internal combustion engine according to the first embodiment can also be applied to an engine system in which the timing at which the wall temperature of the EGR channel 10 becomes higher than the dew point T1differs from the timing at which the integrated fresh air introduction amount Q2 reaches the evaporation necessary amount Q.

In an engine system in which the timing at which the wall temperature of the EGR channel 10 becomes higher than the dew point T1 differs from the timing at which the integrated fresh air introduction amount Q2 reaches the evaporation necessary amount Q, the EGR valve normal drive is executed when the evaporation time tr elapses from a time point at which the wall temperature of the EGR channel 10 becomes higher than the dew point of the EGR gas, and when the evaporation time tr elapses from a time point at which the integrated fresh air introduction amount Q2 has reached the evaporation necessary amount Q.

In the example shown in FIGS. 2 and 3, since, during a time period required for the evaporation time tr to elapse after the integrated fresh air introduction amount Q2 reaches the evaporation necessary amount Q (that is, during the time period t8 to t9 in FIGS. 5A to 5D), the determination result of step S106 becomes repeatedly negative and the processing of step S105 (see FIG. 2) is repeatedly executed, the EGR valve minute drive is not executed (that is, the processing of step S202 is not executed). Alternatively, in another example, when the engine is in the warm-up process and the intake air flow rate is less than or equal to the predetermined value, the EGR valve minute drive may be executed during the time period required for the evaporation time tr to elapse after the integrated fresh air introduction amount Q2 reaches the evaporation necessary amount Q.

In the example shown in FIGS. 1A and 1B of the engine system to which the control apparatus for the internal combustion engine according to the first embodiment is applied, with respect to a low pressure EGR channel 10 configured to connect a part of the intake channel 2 between the air cleaner 5 and the compressor 4a with a part of the exhaust channel 3 between the exhaust gas purifying device 8 and the exhaust gas purifying device 9, the above-described processing is executed to reduce an adverse effect of the condensed water. Alternatively, in another example of an engine system to which the control apparatus for the internal combustion engine according to the first embodiment is applied, with respect to a high pressure EGR channel (not shown) configured to connect a part of the intake channel 2 on the downstream side of the compressor 4a with a part of the exhaust channel 3 on the upstream side of the turbine 4b, a similar processing to the above-described processing may be executed to reduce an adverse effect of the condensed water.

Alternatively, in still another example of an engine system to which the control apparatus for the internal combustion engine according to the first embodiment is applied, the supercharging device 4 may not be provided, and, with respect to an EGR channel (not shown) of the engine system without a supercharging device, a similar processing to the above-described processing may be executed to reduce an adverse effect of the condensed water.

In the example shown in FIGS. 1A and 1B of the engine system to which the control apparatus for the internal combustion engine according to the first embodiment is applied, an intake throttle valve (not shown) and an exhaust throttle valve (not shown) for facilitating introduction of the EGR gas (that is, for increasing the differential pressure between the intake-channel-side portion 10a and the exhaust-channel-side portion 10b) are not installed in the intake channel 2 and the exhaust channel 3, respectively. However, in an example in which these intake throttle valve and the exhaust throttle valve are respectively installed in the intake channel 2 and the exhaust channel 3, these intake throttle valve and the exhaust throttle valve may be fully opened when the EGR valve minute drive is executed.

In the internal combustion engine disclosed in JP 2007-198310A, when the intake air is supplied to the EGR channel to blow off the condensed water in the EGR channel, a large quantity of the intake air may be supplied to the EGR channel. As a result, there is a concern that the atmospheric gas of an exhaust gas purifying device may be made leaner and the exhaust emission may be deteriorated due to a decrease in the exhaust gas purification performance thereof. In contrast, in the example shown in FIGS. 1A and 1B of the engine system to which the control apparatus for the internal combustion engine according to the first embodiment is applied, as described above, the fresh air is supplied to the EGR channel 10 with only a minimum necessary amount in order to evaporate the condensed water in the EGR channel 10. As a result, the example shown in FIGS. 1A and 1B to which the control apparatus for the internal combustion engine according to the first embodiment is applied can reduce concern that the exhaust emission may be deteriorated due to a decrease in the exhaust gas purification performance of the exhaust gas purifying device 9.

As described above, if the EGR valve normal drive is started under a condition in which the condensed water remains in the exhaust-channel-side portion 10b (see FIG. 1A), there is a concern that the condensed water that has flowed into the intake channel 2 from the EGR channel 10 after the start of the EGR valve normal drive may generate an adverse effect at locations, such as the compressor 4a (see FIG. 1A) and the internal combustion engine main body 1 (see FIG. 1A). In the condition described above, it is favorable to evaporate the condensed water in the exhaust-channel-side portion 10b before the start of the EGR valve normal drive.

If the fresh air is not supplied to the exhaust-channel-side portion 10b before the start of the EGR valve normal drive contrary to the example shown in FIGS. 1A and 1B of the engine system to which the control apparatus for the internal combustion engine according to the first embodiment is applied, the evaporation time tr required for the evaporation of the condensed water in the exhaust-channel-side portion 10b to be completed becomes long since the concentration of the EGR gas in the exhaust-channel-side portion 10b is high (that is, the dew point is high). As a result, the start of the EGR valve normal drive is delayed and the fuel consumption may be increased.

In contrast, in the example shown in FIGS. 1A and 1B of the engine system to which the control apparatus for the internal combustion engine according to the first embodiment is applied, as described above, the fresh air is supplied to the exhaust-channel-side portion 10b before the start of the EGR valve normal drive. Thus, the concentration of the EGR gas in the exhaust-channel-side portion 10b is reduced (that is, the dew point is decreased), and, as a result, the evaporation time tr required for the evaporation of the condensed water in the exhaust-channel-side portion 10b to be completed is shortened. Consequently, the start of the EGR valve normal drive can be advanced and the fuel efficiency can be improved.

In a second embodiment, the first embodiment and the other various examples that are described above may be appropriately combined.

What is claimed is:

1. A control apparatus for an internal combustion engine that includes:
   an internal combustion engine main body;
   an intake channel connected to the internal combustion engine main body;
   an exhaust channel connected to the internal combustion engine main body;
   an EGR channel configured to recirculate, into the intake channel, a part of exhaust gas that flows in the exhaust channel;
   an integrated fresh air introduction amount calculation section configured to calculate an integrated fresh air introduction amount that is an integrated amount of fresh air introduced into the exhaust-channel-side portion from the intake-channel-side portion through the EGR valve which is opened with the minute opening degree; and
   an EGR valve installed in the EGR channel and configured to adjust an amount of EGR gas that recirculates into the intake channel through the EGR channel,
   the control apparatus is configured, when the internal combustion engine is in a warm-up process and when an intake air flow rate that is a flow rate of air supplied to the internal combustion engine main body is less than or equal to a predetermined value, to open the EGR valve with a minute opening degree that is an opening degree smaller than a minimum opening degree of the EGR valve with which a condensed water in an exhaust-channel-side portion that is a portion of the EGR channel on a side closer to the exhaust channel relative to the EGR valve flows into an intake-channel-side portion that is a portion of the EGR channel on a side closer to the intake channel relative to the EGR valve, and
   wherein the control apparatus is configured, when the internal combustion engine is in the warm-up process and when the intake air flow rate is less than or equal to the predetermined value, to open the EGR valve with the minute opening degree during a time period required for the integrated fresh air introduction amount calculated by the integrated fresh air introduction calculation section to reach an evaporation necessary amount that is an amount necessary to evaporate the condensed water in the exhaust-channel-side portion.

2. The control apparatus according to claim 1, further comprising:
   a wall temperature estimation section configured to estimate an wall temperature of the EGR channel; and
   an evaporation time calculation section configured to calculate an evaporation time required for completion of evaporation of the condensed water in the exhaust-channel-side portion,
   wherein the control apparatus is configured, after the integrated fresh air introduction amount reaches the evaporation necessary amount and after the wall temperature estimated by the wall temperature estimation section becomes higher than a dew point of the condensed water in the exhaust-channel-side portion, to suspend a EGR valve normal drive, by which the EGR valve is driven in such a manner that a part of the exhaust gas that flows in the exhaust channel is recirculated into the intake channel through the EGR valve, until the evaporation time calculated by the evaporation time calculation section elapses.

* * * * *

UNITED STATES PATENT AND TRADEMARK OFFICE
CERTIFICATE OF CORRECTION

PATENT NO. : 10,247,118 B2
APPLICATION NO. : 15/426613
DATED : April 2, 2019
INVENTOR(S) : Hiroyuki Haga Page 1 of 1

It is certified that error appears in the above-identified patent and that said Letters Patent is hereby corrected as shown below:

In the Specification

In Column 6, Line 41, after "signals", delete ",".

Signed and Sealed this
Fourteenth Day of May, 2019

Andrei Iancu
*Director of the United States Patent and Trademark Office*